United States Patent [19]
Hensley, Jr. et al.

[11] 4,225,421
[45] Sep. 30, 1980

[54] PROCESS FOR HYDROTREATING HEAVY HYDROCARBONS

[75] Inventors: Albert L. Hensley, Jr., Munster, Ind.; Leonard M. Quick, Naperville, Ill.

[73] Assignee: Standard Oil Company (Indiana), Chicago, Ill.

[21] Appl. No.: 20,072

[22] Filed: Mar. 13, 1979

[51] Int. Cl.$^3$ .................. C10G 45/04; C10G 49/04
[52] U.S. Cl. ........................ 208/216 PP; 208/112; 208/210; 208/251 H
[58] Field of Search ............ 208/216 PP, 251 H, 210, 208/112; 252/465, 467

[56] References Cited

U.S. PATENT DOCUMENTS

| | | | |
|---|---|---|---|
| 3,726,790 | 4/1973 | Gallagher et al. | 208/216 X |
| 3,803,027 | 4/1974 | Christman et al. | 208/216 PP |
| 3,876,523 | 4/1975 | Rosinski et al. | 208/251 H |
| 3,898,155 | 8/1975 | Wilson | 208/216 |
| 3,966,588 | 6/1976 | Beaty, Jr. | 208/216 PP |
| 4,008,149 | 2/1977 | Itoh et al. | 208/216 PP |
| 4,016,067 | 4/1977 | Fischer et al. | 208/210 |
| 4,051,021 | 9/1977 | Hamner | 208/216 PP |
| 4,102,822 | 7/1978 | Mulaskey | 208/216 X |
| 4,119,531 | 10/1978 | Hopkins et al. | 208/251 H |

Primary Examiner—Delbert E. Gantz
Assistant Examiner—G. E. Schmitkons
Attorney, Agent, or Firm—David E. Boone; William T. McClain; William H. Magidson

[57] ABSTRACT

A process for hydrodemetallation and hydrodesulfurization of hydrocarbon feedstock containing asphaltenes and metals by contacting said feedstock with hydrogen and a bimodal catalyst consisting essentially of at least one active original hydrogenation metal selected from Group VIB deposited on a support comprising alumina wherein said catalyst has a surface area within the range of about 140 to about 300 m$^2$/gm, a total pore volume based upon measurement by mercury penetration within the range of about 0.4 cc/gm to about 1.0 cc/gm, and comprising about 60% to about 95% of its micropore volume in micropores having diameters within the range of about 50 Å to about 200 Å, 0% to about 15% of its micropore volume in pores having diameters within the range of about 200 Å to about 600 Å and about 3% to about 30% of said total pore volume based upon measurements by mercury penetration in macropores having diameters of 600 Å or greater.

46 Claims, 1 Drawing Figure

PROCESS FOR HYDROTREATING HEAVY HYDROCARBONS

BACKGROUND

This invention relates to a catalytic process for hydrotreating heavy hydrocarbon streams containing asphaltenic material, metals and sulfur compounds. More particularly, this invention relates to hydroprocessing using catalytic treatment with catalyst having a bimodal pore structure and improved effectiveness in the desulfurization and demetallation of metal-containing hydrocarbon streams.

As refiners increase the proportion of heavier, poorer quality crude oil in the feedstock to be processed, the need grows for processes to treat the fractions containing increasingly higher levels of metals, asphaltenes, and sulfur.

It is widely known that various organometallic compounds and asphaltenes are present in petroleum crude oils and other heavy petroleum hydrocarbon streams, such as petroleum hydrocarbon residua, hydrocarbon streams derived from tar sands, and hydrocarbon streams derived from coals. The most common metals found in such hydrocarbon streams are nickel, vanadium, and iron. Such metals are very harmful to various petroleum refining operations, such as hydrocracking, hydrodesulfurization, and catalytic cracking. The metals and asphaltenes cause interstitial plugging of the catalyst bed and reduced catalyst life. The various metal deposits on a catalyst tend to poison or deactivate the catalyst. Moreover, the asphaltenes tend to reduce the susceptibility of the hydrocarbons to desulfurization. If a catalyst, such as a desulfurization catalyst or a fluidized cracking catalyst, is exposed to a hydrocarbon fraction that contains metals and asphaltenes, the catalyst will become deactivated rapidly and will be subject to premature replacement.

Hensley et al in co-pending U.S. patent application Ser. No. 928,141 filed July 26, 1978, which is incorporated herein by reference, disclose a multiple-stage catalytic process for hydrodemetallation and hydrodesulfurization of heavy hydrocarbon streams containing asphaltenes and a substantial amount of metals. The first stage of this process comprises contacting the feedstock in a first reaction zone with hydrogen and a demetallation catalyst comprising hydrogenation metal selected from Group VIB and/or Group VIII deposed on a large-pore, high surface area inorganic oxide support; the second stage of the process comprises contacting the effluent from the first reaction zone with a catalyst consisting essentially of hydrogenation metal selected from Group VIB deposed on a smaller pore, catalytically active support comprising alumina, said second stage catalyst having a surface area within the range of about 150 m²/gm to about 300 m²/gm, an average pore diameter within the range of about 90 Å to about 160 Å, and the catalyst has a pore volume within the range of about 0.4 cc/gm to about 0.9 cc/gm. Hensley et al disclose that as little as 2.2 wt.% cobalt oxide caused more rapid deactivation of their second-stage catalyst for sulfur removal. The catalyst employed in the process of this invention comprises a bimodal pore distribution, that is, the catalyst contains a large fraction of its pore volume in micropores having diameters within the range of about 50 Å to about 200 Å and substantial macropore volume in pores having diameters of 600 Å or greater, but in addition, the catalyst contains a minimum of its micropore volume in pores having diameters within the range of about 200 Å to about 600 Å; this catalyst enables the process of this invention to provide improved hydrodemetallation and hydrodesulfurization.

Examples of multiple-stage catalytic processes for hydrotreatment of heavy hydrocarbon streams containing metals are disclosed in U.S. Pat. Nos. 3,180,820 (Gleim et al., 1965); 3,730,879 (Christman, 1973); 3,977,961 (Hamner, 1976); 3,985,684 (Arey et al., 1977); 4,016,067 (Fischer, 1977); 4,054,508 (Milstein, 1977); 4,051,021 (Hamner, 1977) and 4,073,718 (Hamner, 1978).

The catalysts disclosed in these references contain hydrogenating component comprising one or more metals from Group VIB and/or Group VIII on high surface area support such as alumina, and such combinations of metals as cobalt and molybdenum, nickel and molybdenum, nickel and tungsten, and cobalt, nickel and molybdenum have been found useful. Generally, cobalt and molybdenum have been preferred metals in the catalysts disclosed for hydrotreatment of heavy hydrocarbon streams, both in first-stage catalytic treatment to primarily remove the bulk of the metal contaminants, and in second-stage catalytic treatment primarily for desulfurization. None of the references disclose actual examples of processes employing catalyst containing only Group VIB metal; some of the references, for example the aforementioned U.S. Pat. No. 3,977,961, disclose catalyst micropore structures considered to have beneficial catalyst performance; however, none of the references disclose or suggest the improved performance and bimodal pore structure of the catalyst employed in the process of this invention.

Hopkins et al. in U.S. Pat. No. 4,119,531, which is incorporated herein by reference, disclose a process for hydrodemetallation of hydrocarbon streams containing asphaltenes and a substantial amount of metals, which comprises contacting the hydrocarbon stream with a catalyst consisting essentially of a small amount of a single hydrogenation metal from Group VIB or Group VIII, deposed on a large pore alumina; suitable examples of the hydrogenation metal are nickel or molybdenum. The catalyst is characterized by a surface area of at least 120 m²/gm; a pore volume of at least 0.7 cc/g and an average pore diameter of at least 125 Å units. Hopkins et al. suggest that while hydrodemetallation of heavy hydrocarbon streams is improved by employing catayst consisting essentially of a single Group VIB or Group VIII hydrogenation metal, the substantially demetallated effluent will not normally be sufficiently desulfurized for further refining processes.

U.S. Pat. No. 4,016,067 (Fischer, 1977) discloses a process for removing metal and sulfur contaminants from residual oil fractions by contacting the oil in a dual catalytic bed system wherein the first catalyst comprises a Group VIB metal and an iron group metal oxide, such as a mixture of cobalt and molybdenum oxides, composited with an alumina support that contains delta or theta phase alumina, the catalyst having at least 60% of its pore volume in pores of 100 Å to 200 Å diameter, at least about 5% of its pore volume in pores having a diameter greater than 500 Å, and a surface area up to about 110 m²/gm. The oil is then contacted with a second catalyst of the high-surface area, cobalt-molybdenum on alumina type with a major fraction of its pores in the 30 to 100 Å diameter range. Fischer discloses that the preferred first catalyst and its effectiveness in his process "is believed to be associated with a relatively low surface area of up to about 110 m$^2$/gm and the presence of a demonstrable content of a high temperature phase alumina, i.e., a delta and/or theta alumina." In contrast, the process of this invention employs bimodal catalyst containing only Group VIB metal and in further contrast such catalyst has a surface area of at least about 140 m$^2$/gm and a micropore structure containing less than about 15% of its micropore volume in pores having diameter 200–600 Å, as well as significant macropore content.

U.S. Pat. No. 3,898,155 (Wilson, 1975) discloses a process for the simultaneous demetallization and desulfurization of heavy oils (containing at least 50 ppm metals) under hydrogenation conditions by employing the catalyst composition comprising a Group VI metal and at least one Group VIII metal composite with a refractory oxide, said catalyst composition having from 10% to 40% of the total pore volume in macropores (pores having a pore diameter greater than 600 Å as determined by mercury porosimetry) and from 60% to 90% of the total pore volume in micropores (pores having a diameter in the range 0–600 Å as determined by the nitrogen adsorption method) and at least 80% of the micropore volume being in pores having a diameter of at least 100 Å. In contrast, the process of this invention employs bimodal catalyst containing only Group VIB metal and in further contrast such catalyst contains less than about 75% of its micropore volume in pores having diameters between 100 and 600 Å and less than about 15% of its micropore volume in pores having diameter 200–600 Å.

The general object of this invention is to provide an improved process for hydrodemetallation and hydrodesulfurization of heavy hydrocarbon streams containing metals and asphaltenes. Another object of this invention is to provide improved catalyst for use in such processes.

We have found that the objects of this invention can be obtained in a process for hydrodemetallation and hydrodesulfurization of hydrocarbon feedstock containing asphaltenes and metals by contacting said feedstock with hydrogen and a bimodal catalyst consisting essentially of at least one active original hydrogenation metal selected from Group VIB deposited on a support comprising alumina wherein said catalyst has a surface area within the range of about 140 to about 300 m$^2$/gm, a total pore volume based upon measurement by mercury penetration within the range of about 0.4 cc/gm to about 1.0 cc/gm, and comprising about 60% to about 95% of its micropore volume in micropores having diameters within the range of about 50 Å to about 200 Å, 0% to about 15% of its micropore volume in pores having diameters within the range of about 200 Å to about 600 Å and about/3% to about 30% of said total pore volume in macropores having diameters of 600 Å or greater.

The term "active original hydrogenation metal" is used herein to refer to only the hydrogenation metal that is incorporated into the catalyst during its preparation and does not include any metal that is deposited upon the catalyst during the use of the catalyst in any process. Molybdenum, which is generally superior to chromium and tungsten in demetallation and desulfurization activity, is a preferred Group VIB metal component in the bimodal catalyst.

The bimodal catalyst employed in the process of this invention comprises a pore structure having a bimodal character by which is meant the pore structure comprises a concentration of the pore size distribution in a particularly important range of specified micropores and a significant fraction of macropores, with a minimum of pores having a size intermediate between these concentrations. The terms "micropores" and "micropore volume" are used to refer to that portion of the entire catalyst pore volume contained in pores having a diameter in the range 0 to about 600 Angstrom (A) units as determined by measurement by nitrogen desorption technique derived from the method described by E. V. Ballou, O. K. Dollen in "Analytical Chemistry," Vol. 32, page 532, 1960. The terms "macropores" and "macropore volume" are used to refer to that portion of the entire catalyst pore volume contained in pores having a diameter of 600 A or greater, as determined by measurement by mercury penetration (porosimetry) technique based upon the procedure described by Winslow and Shapiro in ASTM Bulletin; February, 1959.

The bimodal catalyst employed in the process of this invention can be prepared with a support comprising alumina, preferably gamma-alumina, having BET surface area within the range of about 140–300 m$^2$/gm and having exemplary micropore volume distribution ranges, determined by nitrogen desorption technique, as follows:

| Pore diameters, Å | % of Micropore Volume |
|---|---|
| 50–200 | 60–95 |
| 200–600 | <15 |

The alumina should have pore volume distribution ranges determined by mercury penetration technique as follows:

| Pore diameters, Å | % of Total Pore Volume |
|---|---|
| 0–200 | 60–95 |
| 200–600 | 0–15 |
| 600–10,000 | 3–30 |

The support for the bimodal catalyst of this invention is preferably alumina; however, the support can comprise silica, phosphate, or other porous refractory inorganic oxide, preferably in amount less than about 5 wt.% of the support. The gamma-alumina support can be subsequently treated by the typical commercial method of impregnation with a solution or solutions, usually aqueous, containing the heat-decomposable salts of Group VIB metal. A preferred Group VIB metal is molybdenum which is generally superior to chromium and tungsten in desulfurization activity; combinations of the Group VIB metals can also be employed. The hydrogenation metal can be present in the catalyst in an amount within the range of about 3 wt.% to about 30 wt.% or greater, calculated as the oxide of the respective metal and based upon the total catalyst weight. Preferably, the metal is present in an amount of about 5 wt.% to about 15 wt.%.

Suitably, the finished bimodal catalyst employed in the process of this invention can have a BET surface area within the range of about 140 to about 300 m$^2$/gm, a total pore volume based upon measurement by mercury penetration within the range of about 0.4 cc/gm to about 1.0 cc/gm, and comprising about 60% to about 95% of its micropore volume in micropores having diameters within the range of about 50 Å to about 200 Å, 0% to about 15% of its micropore volume in pores having diameters within the range of about 200 Å to about 600 Å and about 3% to about 30% of its total pore volume as determined by mercury penetration in macropores having diameters of 600 Å or greater.

Preferably the bimodal catalyst has a surface area within the range of 150 to 250 m²/g, said total pore volume within the range of about 0.5 cc/g to about 1.0 cc/g and comprising about 70% to about 90% of its micropore volume in micropores having diameter within the range of about 50 to about 200 Å, 0 to about 10% of its micropore volume in micropores having diameters within the range of about 200 to about 600 Å, and about 3.0% to about 15% of said total pore volume in macropores having diameters of 600 Å or greater.

Most preferably, the bimodal catalyst has a surface area within the range of about 150 to 250 m²/g, said total pore volume within the range of about 0.5 cc/g to about 1.0 cc/g, and comprising about 50% to about 90% of its micropore volume in micropores having a diameter within the range of about 80 Å to about 150 Å, 0% to about 10% of its micropore volume in micropores having diameters within the range of about 200 to about 600 Å, and about 3% to about 20% of said total pore volume in macropores having diameters of 600 Å or greater.

Broadly, the present invention is directed to a process for the hydrotreating of heavy hydrocarbon feedstocks. Such feedstocks will contain asphaltenes, metals, nitrogen compounds, and sulfur compounds. It is to be understood that the feedstocks that are to be treated by the process of the present invention will contain from a small amount of metals such as nickel and vanadium, e.g., about 40 ppm, up to more than 1,000 ppm of the combined total amount of nickel and vanadium and up to about 25 wt.% asphaltenes.

When the feedstock to be processed contains a very large amount of metals, generally 100 ppm and typically 150 ppm or more of metals such as nickel and vanadium, the feedstock can be treated in a sequential, two-stage method wherein a demetallation catalyst is employed in a first-stage to provide a partially demetallated effluent which is contacted in a second-stage with the bimodal catalyst employed in this invention which then substantially removes the bulk of the sulfur and remaining metals. Generally if the feedstock to be processed contains less than about 200 ppm and preferably less than about 150 ppm of metals such as nickel and vanadium, the bimodal catalyst alone can be employed without prior partial demetallation of the feedstock.

In the reaction zones, catalysts may be employed in the form of a fixed-bed or an ebullated bed of particles. In the case of a fixed-bed, the particulate material catalyst should have a particle size of at least 1/32 to about ⅛ inch (0.08–0.32 cm) effective diameter.

Typical feedstocks that can be treated satisfactorily by the process of the present invention will contain a substantial amount of components that boil appreciably above 1,000° F. Examples of typical feedstocks are crude oils, topped crude oils, petroleum hydrocarbon residua, both atmospheric and vacuum residua, oils obtained from tar sants, and residua derived from tar sand oil. Such hydrocarbon streams contain organometallic contaminants which create deleterious effects in various refining processes that employ catalyst in the conversion of the particular hydrocarbon stream being treated. The metallic contaminants that are found in such feedstocks include, but are not limited to, iron, vanadium, and nickel.

Nickel is present in the form of soluble organometallic compounds in most crude oils and residuum fractions. The presence of nickel porphyrin complexes and other nickel organometallic complexes causes severe difficulties in the refining and utilization of heavy hydrocarbon fractions, even if the concentration of such complexes is relatively small. It is known that a cracking catalyst deteriorates rapidly and its selectivity changes when in the presence of an appreciable quantity of the organometallic nickel compounds. An appreciable quantity of such organometallic nickel compounds in feedstocks that are being hydrotreated or hydrocracked harmfully affects such processes. The catalyst becomes deactivated and plugging or increasing of the pressure drop in a fixed-bed reactor results from the deposition of nickel compounds in the interstices between catalyst particles.

Iron-containing compounds and vanadium-containing compounds are present in practically all crude oils that are associated with the high Conradson carbon asphaltic and/or asphaltenic portion of the crude. Of course, such metals are concentrated in the residual bottoms, when a crude is topped to remove those fractions that boil below about 450° F. to 600° F. If such residuum is treated by additional processes, the presence of such metals adversely affects the catalyst in such processes. It should be pointed out that nickel-containing compounds deleteriously affect cracking catalysts to a greater extent than do iron-containing compounds. If an oil containing such metals is used as a fuel, the metals will cause poor fuel oil performance in industrial furnaces, since they corrode the metal surfaces of the furnaces.

While metallic contaminants, such as vanadium, nickel, and iron, are often present in various hydrocarbon streams, other metals are also present in a particular hydrocarbon stream. Such metals exist as the oxides or sulfides of the particular metal, or they are present as a soluble salt of the particular metal, or they are present as high molecular weight organometallic compounds, including metal naphthenates and metal porphyrins, and derivatives thereof.

When multiple stage processing is employed, the first-stage demetallation catalyst and the second-stage bimodal catalyst can be employed in a single reactor as a dual bed or the two catalysts can be employed in separate, sequential reactors, and various combinations of these two basic reactor schemes can be employed to achieve flexibility of operation and product upgrade. In commercial operation, either of the basic reactor schemes described can comprise multiple parallel beds of the catalyst. In any reactor scheme used in the process of this invention, the volumetric ratio of first-stage catalyst to second-stage catalyst can be within a broad range, preferably within about 5:1 to about 1:10 and more preferably within about 2:1 to about 1:5.

The first-stage demetallation catalyst can comprise a hydrogenation component and a large-pore, high-surface area inorganic oxide support. Suitable demetallation catalyst typically comprises hydrogenation metal selected from Group VIB and/or Group VIII deposited on a large-pore, high-surface area inorganic oxide support, suitably alumina, silica, magnesia, zirconia and similar materials; the first-stage demetallation catalyst typically has a surface area of about 120 m²/gm to about 400 m²/gm, an average pore diameter within the range of about 125 Å to about 350 Å, and a pore volume within the range of about 0.7 cc/gm to about 1.5 cc/gm based upon nitrogen adsorption measurement. Suitably, the composition of the demetallation catalyst comprises from about 0.5 to about 30 wt.% of the Group VIB metal, calculated as the oxide, and/or from about 0.5 to about 12 wt.% of the Group VIII metal, calculated as the oxide, based upon the total weight of the composition. The Group VIB and Group VIII classifications of the Periodic Table of Elements can be found on page 628 of WEBSTER's SEVENTH NEW COLLEGIATE DICTIONARY, G. & C. Merriam Company, Springfield, Massachusetts, U.S.A. (1965). While calculated as the oxide, the hydrogenation metal components of the catalyst can be present as the element, as an oxide thereof, as a sulfide thereof, or mixtures thereof. When the first-stage catalyst is prepared to comprise both Group VIB and Group VIII metals, the Group VIII metal should be limited to less than about 3 wt.%, calculated as the oxide of the Group VIII metal based upon total weight of the prepared catalyst, in order to limit the catalyst deactivation influence of the Group VIII metal, particularly a cobalt component, when the catalyst is used to hydrotreat asphaltenic heavy hydrocarbons containing a substantial amount of metals. Preferably, the hydrogenation metal component of the first-stage demetallation catalyst comprises only a single active original hydrogenation metal selected from Group VIB or Group VIII; molybdenum, which is generally superior to chromium and tungsten in demetallation and desulfurization activity, is a preferred Group VIB metal component in both the first-stage demetallation catalyst, and the second-stage bimodal catalyst. While generally Group VIB metal provides superior demetallation activity in comparison to Group VIII metal, nickel is a preferred Group VIII metal component in the first-stage demetallation catalyst. Preferably, the Group VIB of Group VIII metal is present in the demetallation catalyst in an amount of about 0.5 wt.% to about 3 wt.% and most preferably about 1-2 wt.%, in order to minimize metal requirements while supplying sufficient demetallation activity in the first-stage catalyst.

First-stage demetallation catalyst can be prepared by the typical commercial method of impregnating a large-pore, high-surface area inorganic oxide support, typically appropriate commercially available alumina, as described in U.S. Pat. No. 4,119,531.

In multiple stage processing, as well as in processing employing the bimodal catalyst alone, both the first reaction zone and the second reaction zone operating conditions for the hydrotreatment of heavy hydrocarbon streams, such as petroleum hydrocarbon residua and the like, comprise a hydrogen pressure within the range of about 800 psi to about 3,000 psi (5.5–20.7 MPa), an average catalyst bed temperature within the range of about 700° F. (371° C.) to about 850° F. (454° C.), an LHSV within the range of about 0.1 volume of hydrocarbon per hour per volume of catalyst to about 5 volumes of hydrocarbon per hour per volume of catalyst, and a hydrogen recycle rate or hydrogen addition rate within the range of about 1,000 SCFB (178 m³/m³) to about 20,000 SCFB (3,562 m³/m³). Preferably, the operating conditions comprise a hydrogen pressure within the range of about 1,200 psi to about 2,000 psi (8.3–13.8 MPa); an average catalyst bed temperature within the range of about 730° F. (387° C.) to about 820° F. (437° C.); an LHSV within the range of about 0.3 to about 4; and a hydrogen recycle rate or hydrogen addition rate within the range of about 5,000 SCFB (890 m³/m³) to about 10,000 SCFB (1781 m³/m³).

If the process of the present invention were to be used to treat hydrocarbon distillates, the operating conditions would comprise a hydrogen partial pressure within the range of about 200 psi (1.4 MPa) to about 3,000 psi (20.7 MPa); an average catalyst bed temperature within the range of about 600° F. (315° C.) to about 800° F. (426° C.); an LHSV within the range of about 0.4 volume of hydrocarbon per hour per volume of catalyst to about 6 volumes of hydrocarbon per hour per volume of catalyst; and a hydrogen recycle rate or hydrogen addition rate within the range of about 1,000 SCFB (178 m³/m³) to about 10,000 SCFB (1781 m³/m³). Preferred operating conditions for the hydrotreating of hydrocarbon distillates comprise a hydrogen partial pressure within the range of about 200 psi (1.4 MPa) to about 1,200 psi (8.3 MPa); an average catalyst bed temperature within the range of about 600° F. (315° C.) to about 750° F. (398° C.); an LHSV within the range of about 0.5 volume of hydrocarbon per hour per volume of catalyst to about 4 volumes of hydrocarbon per hour per volume of catalyst; and a hydrogen recycle rate or hydrogen addition rate within the range of about 1,000 SCFB (178 m³/m³) to about 6,000 SCFB (1068 m³/m³).

The following examples are illustrative of this invention but do not indicate limitation upon the scope of the claims.

EXAMPLE 1

Catalyst 1, representing a preferred embodiment of the bimodal catalyst employed in the process of the present invention was prepared to contain approximately 10 wt.% $MoO_3$, with properties more fully specified in Table II. Catalyst 1 was prepared on a 1/16th inch gamma-alumina extrudate support obtained from the Davison Chemical Division of W. R. Grace & Company with support properties fully specified in Table I as S1. The support was calcined at about 1,000° F. (538° C.) in still air for about 1 hour and cooled in a desiccator. About 90.0 grams of the calcined support was impregnated with 110 ml of distilled water containing 12.3 grams of ammonium molybdate and the mixture was left to stand overnight. The excess water was removed using a heat lamp for about two hours and the dried catalyst was calcined at 1,000° F. (538° C.) for about two hours in still air.

The process of the present invention was operated in an embodiment using Catalyst $A_2$ as a first-stage demetallation catalyst and bimodal Catalyst 1 as a second-stage catalyst. Catalyst $A_2$ contained approximately 1 wt.% $MoO_3$ on a large-pore alumina support, with the catalyst properties more fully specified in Table IV.

Prior to use, each catalyst was calcined in still air at a temperature of about 1,000° F. (538° C.) for 1 hour and cooled in a desiccator. Feedstock I for this example was an Ardeshir petroleum crude vacuum resid fraction having properties presented in Table V. The run was conducted downflow; the first-stage Catalyst $A_2$ formed the top section of a fixed bed and the bimodal Catalyst 1 formed the bottom section of the fixed bed in approximately 1:1 volumetric ratio of the two catalysts.

The run was carried out in a bench-scale test unit having automatic controls for pressure, flow of reactants, and temperature. The reactor was made from ⅜-inch (0.95 cm) inside diameter stainless steel, heavy-walled tubing. A ⅛-inch (0.32 cm) outside diameter thermowell extended up through the center of the reactor. The reactor was heated by an electrically-heated steel block. The hydrocarbon feedstock was fed to the unit by means of a Ruska pump, a positive-displacement pump. The 14-to-20-mesh (U.S. Sieve Series) catalyst material was supported on 8-to-10-mesh alundum particles. Approximately 18 cubic centimeters of the dual bed of the catalysts in 1:1 volumetric ratio were employed. This amount of catalyst provided a catalyst bed length of about 9 inches. About 12-inch layer of 8-to-10-mesh alundum particles was placed over the catalyst bed in the reactor. The catalysts were placed in the annular space between the thermowell and the internal wall of the ⅜-inch (0.95 cm) inside-diameter reactor.

Selected samples from the run were obtained from the product receiver and were analyzed for pertinent information. Data obtained from samples taken during the 6th day of operation conducted at an LHSV of 0.7 volume of hydrocarbon per hour per volume of catalyst, a temperature of 780° F. (415° C.), and a pressure of 1,800 psig (122 atmos), are presented hereinbelow as Run 1 in Tables VI and VIII.

EXAMPLE 2

Another two-stage embodiment of the process of this invention was operated employing Catalyst $A_2$ and bimodal Catalyst 2 using the same feedstock, equipment, operating conditions and catalyst pretreatment as described in Example 1. Catalyst 2 was prepared in the same manner as Catalyst 1 with support $S_2$ having properties fully specified in Table I. The results of this operation are presented as Run 2 in Table VI.

EXAMPLES 3-6

For comparative purposes, Runs 3 through 6, with results presented in Tables VI–VIII, were made in two-stage operation with the catalysts and feedstock indicated for each run. Catalyst 4, 5 and 6, with properties fully specified in Tables II and III, were prepared in the same manner as described in Example 1 with the corresponding supports presented in Table I. Catalyst 4 was prepared to contain a cobalt component by impregnating bimodal support $S_1$ with a solution of both cobalt nitrate and ammonium molybdate. Runs 3-6 were made in similar equipment and under the same conditions and catalyst pretreatment described in Example 1 with the exception that in Run 3 employing the cobalt-containing Catalyst 4 in the second-stage prior to establishing hydrocarbon flow, the dual bed of Catalyst $A_2$ and Catalyst 4 were subjected to a conventional presulfiding treatment with a gas mixture containing 8 mole % hydrogen sulfide in hydrogen at a pressure of about 500 psig, with the temperature slowly raised from 300° F. (148° C.) to about 700° F. (371° C.). As Tables VI and VIII indicate, cobalt-containing Catalyst 4 has resulted in reduced sulfur and metals removal at 6 days on oil in comparison to Run 1 employing an embodiment of the catalyst of this invention having no cobalt component.

EXAMPLES 7 AND 8

Comparative Runs 7 and 8 employing a single bed of bimodal Catalyst 3 in Run 8 and a single bed of Catalyst 5, without appreciable bimodal pore structure, in Run 7, were made processing Feedstock III, a lower metal feed. Both runs were made in similar equipment and under the same conditions and catalyst pretreatment described in Example 1 with the exception that the LHSV in both runs was reduced to 0.4. Results of Runs 7 and 8 are presented in Table IX which indicates the superior performance of bimodal Catalyst 3.

Table I

| Catalyst Support Properties | | | | |
|---|---|---|---|---|
| Support | $S_1$ | $S_2$ | $S_3$ | $S_4$ |
| Surface Area, m²/gm (BET) | 181 | 181 | 192 | 250 |
| Pore Volume, cc/gm ($N_2$ method) | 0.80 | 0.78 | 0.76 | 0.83 |
| Average Pore Diameter, Å | 177 | 172 | 158 | 133 |
| Micropore Volume Distribution (determined by $N_2$ desorption) | | | | |
| % of Pore Volume in: | | | | |
| 0–50 Å Diameter Pores | 1.9 | 2.5 | 1.3 | 14.0 |
| 50–80 Å | 8.7 | 10.6 | 18.1 | 24.5 |
| 80–100 Å | 13.0 | 14.3 | 35.7 | 14.1 |
| 100–130 Å | 29.9 | 29.6 | 39.6 | 20.7 |
| 130–150 Å | 17.9 | 16.3 | 4.0 | 11.0 |
| 150–200 Å | 21.9 | 18.4 | 0.6 | 10.8 |
| 200–400 Å | 5.3 | 6.0 | 0.5 | 3.8 |
| 400–600 Å | 0.6 | 0.9 | 0.1 | 0.7 |
| 600–1200 Å | 0.9 | 1.4 | 0.1 | 0.4 |
| Total Pore Volume, cc/gm (determined by Hg penetration) | 0.69 | 0.75 | | |
| % of Total Volume in: | | | | |
| 0–200 Å Diameter Pores | 91.5 | 84.8 | | |
| 200–400 Å | 3.9 | 3.9 | | |
| 400–600 Å | 0.8 | 1.2 | | |
| 600–1000 Å | 0.9 | 1.1 | | |
| 1000–10,000 Å | 1.5 | 8.2 | | |
| 10,000+ Å | 1.5 | 0.8 | | |

Table II

| Catalyst Properties | | | | |
|---|---|---|---|---|
| Catalyst | 1 | 2 | 3 | 4 |
| Support | $S_1$ | $S_2$ | $S_2$ | $S_1$ |
| Wt. % $MoO_3$ | 10 | 14.9 | 10 | 9.9 |
| Wt. % CoO | — | — | — | 2.9 |
| Surface Area, m²/gm (BET) | 176 | 167 | 176 | 175 |
| Pore Volume, cc/gm ($N_2$ method) | .72 | .65 | 0.69 | 0.70 |
| Average Pore Diameter, Å | 162 | 156 | 157 | 160 |
| Micropore Volume Distribution (determined by $N_2$ desorption) | | | | |
| % of Pore Volume in: | | | | |
| 0–50 Å Diameter Pores | 2.6 | 4.1 | 3.4 | 2.6 |
| 50–80 Å | 10.8 | 12.0 | 12.0 | 9.8 |
| 80–100 Å | 13.6 | 14.3 | 15.2 | 13.7 |
| 100–130 Å | 29.4 | 26.2 | 28.5 | 32.3 |
| 130–150 Å | 17.1 | 15.0 | 15.7 | 18.2 |
| 150–200 Å | 19.7 | 19.1 | 17.3 | 17.6 |
| 200–400 Å | 5.1 | 6.7 | 5.6 | 4.0 |
| 400–600 Å | 0.6 | 0.9 | 1.0 | 0.8 |
| 600–1200 Å | 1.1 | 1.1 | 1.3 | 1.0 |
| Total Pore Volume, cc/gm (determined by Hg penetration) | 0.68 | 0.67 | | |
| % of Total Volume in: | | | | |
| 0–200 Å Diameter Pores | 91.0 | 79.2 | | |
| 200–400 Å | 4.3 | 8.8 | | |
| 400–600 Å | 1.2 | 0.9 | | |
| 600–1000 Å | 0.9 | 1.5 | | |
| 1000–10,000 Å | 2.0 | 9.0 | | |

Table II-continued

| Catalyst Properties | | | | |
|---|---|---|---|---|
| Catalyst | 1 | 2 | 3 | 4 |
| Support | $S_1$ | $S_2$ | $S_2$ | $S_1$ |
| 10,000+ Å | 0.6 | 0.7 | | |

Table III

| Catalyst Properties | | |
|---|---|---|
| Catalyst | 5 | 6 |
| Support | $S_3$ | $S_4$ |
| Wt. % $MoO_3$ | 10.0 | 9.0 |
| Wt. % CoO | — | — |
| Surface Area, $m^2$/gm (BET) | 190 | 204 |
| Pore Volume, cc/g ($N_2$ method) | 0.65 | 0.82 |
| Average Pore Diameter, Å | 137 | 161 |
| Micropore Volume Distribution (determined by $N_2$ desorption) % of Pore Volume in: | | |
| 0–50 Å Diameter Pores | 4.1 | 2.9 |
| 50–80 Å | 23.3 | 11.0 |
| 80–100 Å | 35.2 | 14.2 |
| 100–130 Å | 27.6 | 28.0 |
| 130–150 Å | 3.9 | 19.3 |
| 150–200 Å | 2.9 | 22.6 |
| 200–400 Å | 1.9 | 1.8 |
| 400–600 Å | 0.5 | 0.2 |
| 600–1200 Å | 0.9 | 0.0 |
| Total Pore Volume (determined by Hg penetration) | 0.56 | 0.70 |
| % of Total Volume in: | | |
| 0–200 Å Diameter Pores | 98.0 | 94.6 |
| 200–400 Å | 0.9 | 3.9 |
| 400–600 Å | 0.1 | 0.5 |
| 600–1000 Å | 0.1 | 0.5 |
| 1000–10,000 Å | 0.3 | 0.6 |
| 10,000+ Å | 0.7 | 0.0 |

Values specified for support and catalyst surface area are obtained by the BET nitrogen adsorption method and values specified for pore volume determined by nitrogen method are also obtained by nitrogen adsorption. Measurement of pore size distribution by the nitrogen method was obtained by a Digisorb 2500 instrument, manufactured by Micromeritics Instrument Corp., employing nitrogen desorption technique. Specified average pore diameters are those calculated by means of the expression:

$$A.P.D. = (4 \times P.V. \times 10^4)/S.A.$$

wherein
A.P.D. = average pore diameter in Å,
P.V. = pore volume in cc/gm, and
S.A. = surface area in $m^2$/gm

TABLE IV

| First Stage Catalyst Properties | | |
|---|---|---|
| CATALYST | $A_1$ | $A_2$ |
| HYDROGENATION METAL: | | |
| WT. % $MoO_3$ | 2.0 | 1.0 |
| PHYSICAL PROPERTIES ($N_2$ methods) | | |
| SURFACE AREA $m^2$/gm (BET) | 179 | 186 |
| PORE VOLUME, cc/gm | 0.886 | 0.87 |
| AVERAGE PORE DIAMETER, Å | 198.1 | 187 |
| % OF PORE VOLUME IN: | | |
| 0–50 Å PORES | 1.5 | 2.7 |
| 50–80 Å PORES | 7.2 | 9.5 |
| 80–130 Å PORES | 31.8 | 33.7 |
| 130–200 Å PORES | 33.5 | 29.4 |
| 200 Å + PORES | 26.0 | 24.6 |

Catalysts $A_1$ and $A_2$ were obtained from American Cyanamid Company and can be prepared using aqueous solution of ammonium molybdate to impregnate calcined, large-pore high surface area alumina supports, for example alumina commercially available from Kaiser Chemicals Division of Kaiser Aluminum and Chemicals Corporation or from American Cyanamid Company. Catalyst $A_1$ was reimpregnated with aqueous solution of ammonium molybdate and recalcined, as indicated by its slightly higher $MoO_3$ content which did not alter its effective performance in comparison with Catalyst $A_2$.

Table V

| Feedstock Properties | | | |
|---|---|---|---|
| | I Ardeshir Vacuum Resid | II Ardeshir Vacuum Resid | III Kuwait Vacuum Resid |
| API Gravity | 5 | 5 | 6 |
| Carbon, Wt. % | 83.53 | 83.83 | 83.45 |
| Hydrogen, Wt. % | 9.67 | 10.15 | 10.26 |
| Sulfur, Wt. % | 5.7 | 5.0 | 5.2 |
| Nitrogen, Wt. % | 0.60 | 0.50 | 0.37 |
| Carbon Residue, Wt. % | 28 | 21 | 20 |
| Ni, ppm | 72 | 60 | 27 |
| V, ppm | 262 | 210 | 105 |
| 1000° F., Wt. % | 0 | 4 | 4 |
| Asphaltenes, Wt. % | 16 | 11 | 8 |

Table VI

| Feedstock I | | | | |
|---|---|---|---|---|
| Run No. | 1 | 2 | 3 | 4 |
| Catalysts | $A_2 + 1$ | $A_2 + 2$ | $A_2 + 4$ | $A_2 + 5$ |
| Temperature, °F. | 780 | 780 | 780 | 780 |
| Pressure, psig | 1800 | 1800 | 1800 | 1800 |
| LHSV | 0.7 | 0.7 | 0.7 | 0.7 |
| Hydrogen rate, SCFB | 8000 | 8000 | 8000 | 8000 |
| % Sulfur removal | 69.5 | 64.5 | 60.0 | 57.7 |
| % Nickel removal | 68 | 61 | 60 | 49 |
| % Vanadium removal | 85 | 85 | 81 | 68 |
| Days on Oil | 6 | 6 | 6 | 6 |
| Product Gravity, °API | 13.7 | 12.7 | 13.2 | 12.6 |

Table VII

| Feedstock II | | |
|---|---|---|
| Run No. | 5 | 6 |
| Catalysts | $A_1 + 5$ | $A_1 + 6$ |
| Temperature, °F. | 780 | 780 |
| Pressure, psig | 1800 | 1800 |
| LHSV | 0.7 | 0.7 |
| Hydrogen rate, SCFB | 8000 | 8000 |
| % Sulfur removal | 75.6 | 65.0 |
| % Nickel removal | 65 | 65 |
| % Vanadium removal | 83 | 85 |
| Days on Oil | 6 | 6 |
| Product Gravity, °API | 17.2 | 15.5 |

Table VIII

| Feedstock I | | | | | | |
|---|---|---|---|---|---|---|
| Run No. | 1 | | 3 | | 4 | |
| Catalysts | $A_2 + 1$ | | $A_2 + 4$ | | $A_2 + 5$ | |
| Temperature, °F. | 780 | 780 | 780 | 780 | 780 | 780 |
| Pressure, psig | 1800 | 1800 | 1800 | 1800 | 1800 | 1800 |
| LHSV | 0.7 | 0.7 | 0.7 | 0.7 | 0.7 | 0.7 |
| Hydrogen rate, SCFB | 8000 | 8000 | 8000 | 8000 | 8000 | 8000 |
| % Sulfur removal | 68.8 | 69.5 | 80.5 | 60.0 | 56.3 | 57.7 |
| % Nickel removal | 60 | 68 | 75 | 60 | 50 | 49 |
| % Vanadium removal | 84 | 85 | 90 | 81 | 69 | 68 |
| Days on Oil | 1 | 6 | 1 | 6 | 1 | 6 |

Table VIII-continued

| Feedstock I | | | | | | |
|---|---|---|---|---|---|---|
| Run No. | 1 | | 3 | | 4 | |
| Catalysts | A₂ + 1 | | A₂ + 4 | | A₂ + 5 | |
| Product Gravity, °API | 15.1 | 13.7 | 15.7 | 13.2 | 13.3 | 12.6 |

Table IX

| Feedstock III | | |
|---|---|---|
| Run No. | 7 | 8 |
| Catalysts | 5 | 3 |
| Temperature, °F. | 780 | 780 |
| Pressure, psig | 1800 | 1800 |
| LHSV | 0.4 | 0.4 |
| Hydrogen rate, SCFB | 8000 | 8000 |
| % Sulfur removal | 82.9, 80.9 | 85.0 |
| % Nickel removal | 67, 74* | 96* |
| % Vanadium removal | 82, 85* | 99* |
| Days on Oil | 6 | 6 |
| Product Gravity, °API | 21.6 | 21.8 |

*These nickel and vanadium analyses were obtained by atomic adsorption; all other nickel, vanadium and sulfur analyses by X-ray fluorescence.

Figure 1:
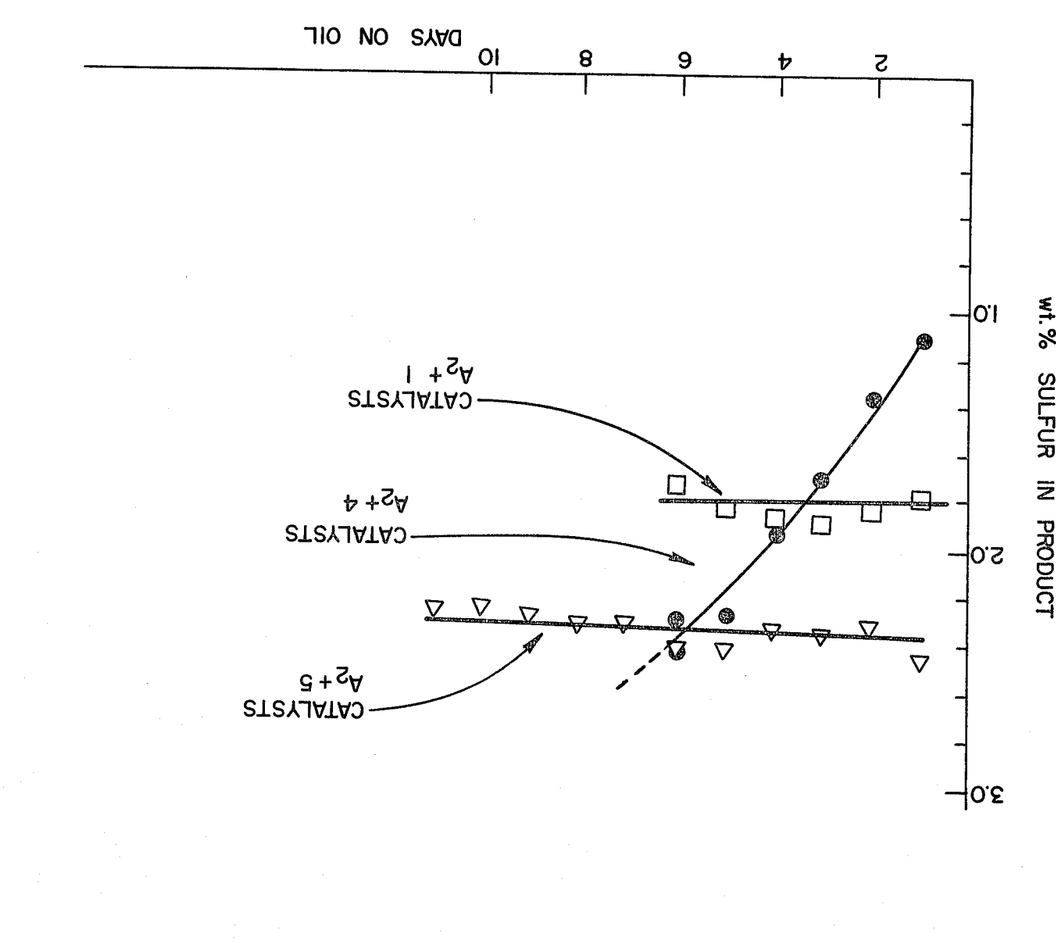
The drawing depicts comparative desulfurization performance of two-stage processes in which the second bed of catalyst is in one case a bimodal catalyst employed by this invention.

As Tables VI and VIII and the Drawing indicate, cobalt-containing Catalyst 4 has resulted in declining sulfur and metals removal by six days on oil in comparison to embodiments of the catalyst of this invention, Catalysts 1 and 2 having no cobalt component. In addition, Tables III and VII demonstrate that merely shifting a portion of the micropore volume into micropores of larger diameter as in Catalyst 6 in comparison to Catalyst 5 results in poorer desulfurization performance even though Catalyst 6 has a micropore structure more similar to bimodal Catalyst 1.

Overall, the results have shown that the catalyst of this invention is superior to catalyst without appreciable bimodal pore structure or catalyst containing a cobalt component as summarized in the Drawing.

We claim:

1. A process for the hydrodemetallation and hydrodesulfurization of hydrocarbon feedstock containing asphaltenes and metals, said feedstock comprising at least one member selected from the group consisting of crude oil, topped crude oil, petroleum hydrocarbon residua, oils obtained from tar sands, and residua derived from tar sands oil, which process comprises contacting said hydrocarbon feedstock with hydrogen and a bimodal catalyst consisting essentially of at least one active original hydrogenation metal selected from Group VIB deposited on a support comprising alumina, said Group VIB metal being in at least one form selected from the group consisting of the elemental form, the oxide, and the sulfide, said catalyst having a surface area within the range of about 140 to about 300 m²/gm, a total pore volume based upon measurement by mercury penetration within the range of about 0.4 cc/gm to about 1.0 cc/gm, and comprising about 60% to about 95% of its micropore volume in micropores having diameters within the range of about 50 Å to about 200 Å, 0% to about 15% of its micropore volume in pores having diameters within the range of about 200 Å to about 600 Å and about 3% to about 30% of said total pore volume in macropores having diameters of 600 Å or greater.

2. The process of claim 1 wherein said catalyst has a surface area within the range of about 150 to 250 m²/gm, said total pore volume within the range of about 0.5 cc/gm to about 1.0 cc/gm and comprising about 70% to about 90% of its micropore volume in micropores having diameter within the range of about 50 to about 200 Å, 0% to about 10% of its micropore volume in micropores having diameters within the range of about 200 to about 600 Å, and about 3% to about 15% of said total pore volume in macropores having diameters of 600 Å or greater.

3. The process of claim 1 wherein said catalyst has a surface area within the range of about 150 to 250 m²/gm, said total pore volume within the range of about 0.5 cc/gm to about 1.0 cc/gm, and comprising about 50% to about 90% of its micropore volume in micropores having a diameter within the range of about 80 Å to about 150 Å, 0% to about 10% of its micropore volume in micropores having diameters within the range of about 200 to 600 Å, and about 3% to about 20% of said total pore volume in macropores having diameters of 600 Å or greater.

4. The process of claim 1 wherein the amount of Group VIB metal present in said catalyst is within the range of about 3 wt.% to about 30 wt.%, calculated as metal oxide and based upon the total catalyst weight.

5. The process of claim 1 wherein said catalyst support is alumina.

6. The process of claim 1 wherein said process is carried out under conditions comprising a hydrogen pressure within the range of about 800 to 3,000 psi (5.5 to 20.7 MPa), an average catalyst bed temperature within the range of about 700° F. to about 850° F. (371° to 454° C.), an LHSV within the range of about 0.1–5 volumes of hydrocarbon per hour per volume of catalyst and a hydrogen rate within the range of about 1,000 SCFB to about 20,000 SCFB (178 to 3,562 m³/m³).

7. The process of claim 1 wherein the hydrocarbon feedstock comprises petroleum hydrocarbon residua.

8. The process of claim 1 wherein the hydrocarbon feedstock comprises oils or residua obtained from tar sands.

9. The process of claim 1 wherein the hydrocarbon feedstock contains metals in an amount less than about 150 parts per million.

10. The process of claim 9 wherein said hydrocarbon feedstock comprises petroleum hydrocarbon residua.

11. The process of claim 9 wherein said hydrocarbon feedstock comprises oils or residua obtained from tar sands.

12. The process of claim 1 comprising contacting said feedstock with hydrogen and a first-stage demetallation catalyst in a first reaction zone to remove a portion of the metals from said feedstock and contacting the effluent from said first reaction zone with said bimodal catalyst in a second reaction zone.

13. The process of claim 12 wherein said first-stage demetallation catalyst comprises a hydrogenation metal component selected from the group consisting of Group VIB metal, Group VIII metal, and a mixture of said Group VIB and Group VIII metals, and a porous inorganic oxide support, said hydrogenation metal being in at least one form selected from the group consisting of the elemental form, the oxide, and the sulfide, and said catalyst having a surface area of about 120 m²/gm to about 400 m²/gm, a pore volume of about 0.7 cc/gm to about 1.5 cc/gm, and an average pore diameter of about 125 Å to about 350 Å.

14. The process of claim 13 wherein the hydrogenation metal component of said first-stage demetallation catalyst is a member of Group VIB.

15. The process of claim 14 wherein the Group VIB metal of said first-stage demetallation catalyst is molybdenum and the amount of molybdenum present in said catalyst is within the range of about 0.5 wt.% to about 3 wt.%, calculated as $MoO_3$ and based upon the total catalyst weight.

16. The process of claim 15 wherein the hydrocarbon feedstock comprises petroleum hydrocarbon residua.

17. The process of claim 15 wherein the hydrocarbon feedstock comprises oils or residua obtained from tar sands.

18. The process of claim 15 wherein the hydrocarbon feedstock contains metals in an amount of at least about 150 parts per million.

19. The process of claim 15 wherein said hydrocarbon feedstock comprises petroleum hydrocarbon residua.

20. The process of claim 15 wherein said hydrocarbon feedstock comprises oils or residua obtained from tar sands.

21. A process for the hydrodemetallation and hydrodesulfurization of hydrocarbon feedstock containing asphaltenes and metals, said feedstock comprising at least one member selected from the group consisting of crude oil, topped crude oil, petroleum hydrocarbon residua, oils obtained from tar sands, and residua derived from tar sands oil, which process comprises contacting said hydrocarbon feedstock with hydrogen and a bimodal catalyst consisting essentially of molybdenum as the single active original hydrogenation metal deposited on a support comprising alumina, said molybdenum being in at least one form selected from the group consisting of the elemental form, the oxide, and the sulfide, said catalyst having a surface area within the range of about 140 to about 300 $m^2/gm$, a total pore volume based upon measurement by mercury penetration within the range of about 0.4 cc/gm to about 1.0 cc/gm, and comprising about 60% to about 95% of its micropore volume in micropores having diameters within the range of about 50 Å to about 200 Å, 0% to about 15% of its micropore volume in pores having diameters within the range of about 200 Å to about 600 Å and about 3% to about 30% of said total pore volume in macropores having diameters of 600 Å or greater.

22. The process of claim 21 wherein said catalyst has a surface area within the range of about 150 to 250 $m^2/gm$, said total pore volume within the range of about 0.5 cc/gm to about 1.0 cc/gm and comprising about 70% to about 90% of its micropore volume in micropores having diameters within the range of about 50 to about 200 Å, 0% to about 10% of its micropore volume in micropores having diameters within the range of about 200 to about 600 Å, and about 3% to about 15% of said total pore volume in macropores having diameters of 600 Å or greater.

23. The process of claim 21 wherein said catalyst has a surface area within the range of about 150 to 250 $m^2/gm$, said total pore volume within the range of about 0.5 cc/gm to about 1.0 cc/gm, and comprising about 50% to about 90% of its micropore volume in micropores having a diameter within the range of about 80 Å to about 150 Å, 0% to about 10% of its micropore volume in micropores having diameters within the range of about 200 to about 600 Å, and about 3% to about 20% of said total pore volume in macropores having diameters of 600 Å or greater.

24. The process of claim 21 wherein the amount of molybdenum present in said catalyst is within the range of about 3 wt.% to about 30 wt.% calculated as $MoO_3$ and based upon the total catalyst weight.

25. The process of claim 21 wherein the amount of molybdenum present in said catalyst is within the range of about 5 wt.% to about 15 wt.% calculated as $MoO_3$ and based upon the total catalyst weight.

26. The process of claim 21 wherein said catalyst support is alumina.

27. The process of claim 21 wherein said process is carried out under conditions comprising a hydrogen pressure within the range of about 800 to 3,000 psi (5.5 to 20.7 MPa), an average catalyst bed temperature within the range of about 700° F. to about 850° F. (371° to 454° C.), an LHSV within the range of about 0.1–5 volumes of hydrocarbon per hour per volume of catalyst and a hydrogen rate within the range of about 1000 SCFB to about 20,000 SCFB (178 to 3,562 $m^3/m^3$).

28. The process of claim 21 wherein the hydrocarbon feedstock comprises petroleum hydrocarbon residua.

29. The process of claim 21 wherein the hydrocarbon feedstock comprises oils or residua obtained from tar sands.

30. The process of claim 21 wherein the hydrocarbon feedstock contains metals in an amount less than about 150 parts per million.

31. The process of claim 30 wherein said hydrocarbon feedstock comprises petroleum hydrocarbon residua.

32. The process of claim 30 wherein said hydrocarbon feedstock comprises oils or residua obtained from tar sands.

33. The process of claim 21 comprising contacting said feedstock with hydrogen and a first-stage demetallation catalyst in a first reaction zone to remove a portion of the metals from said feedstock and contacting the effluent from said first reaction zone with said bimodal catalyst in a second reaction zone.

34. The process of claim 33 wherein said first-stage demetallation catalyst comprises a hydrogenation metal component selected from the group consisting of Group VIB metal, Group VIII metal, and a mixture of said Group VIB and Group VIII metals, and a porous inorganic oxide support, said hydrogenation metal being in at least one form selected from the group consisting of the elemental form, the oxide, and the sulfide, and said catalyst having a surface area of about 120 $m^2/gm$ to about 400 $m^2/gm$, a pore volume of about 0.7 cc/gm to about 1.5 cc/gm, and an average pore diameter of about 125 Å to about 350 Å.

35. The process of claim 34 wherein the hydrogenation metal component of said first-stage demetallation catalyst is a member of Group VIB.

36. The process of claim 35 wherein the Group VIB metal of said first-stage demetallation catalyst is molybdenum and the amount of molybdenum present in said catalyst is within the range of about 0.5 wt.% to about 3 wt.% calculated as $MoO_3$ and based upon the total catalyst weight.

37. The process of claim 34 wherein said first-stage demetallation catalyst comprises a Group VIB metal and less than about 3 weight percent of a Group VIII metal, calculated as the oxide and based upon the total catalyst weight.

38. The process of claim 34 wherein conditions in the second reaction zone comprise an average catalyst bed temperature within the range of about 700° F. to about 850° F. (371° to 454° C.), a liquid hourly space velocity within the range of about 0.1 volume of hydrocarbon per hour per volume of catalyst to about 5 volumes of hydrocarbon per hour per volume of catalyst, and a hydrogen pressure within the range of about 800 psi to about 3,000 psi (5.5 to 20.7 MPa).

39. The process of claim 34 wherein conditions in the second reaction zone comprise an average catalyst bed temperature within the range of about 730° F. to about 820° F., a liquid hourly space velocity within the range of about 0.3 volume of hydrocarbon per hour per volume of catalyst to about 4 volumes of hydrocarbon per hour per volume of catalyst, and a pressure within the range of about 1,200 psia to about 2,000 psia (8.2 to 13.8 MPa).

40. The process of claim 34, wherein the volumetric ratio of said demetallation catalyst to said bimodal catalyst is within the range of about 5:1 to about 1:10.

41. The process of claim 40, wherein the volumetric ratio is within the range of about 2:1 to about 1:5.

42. The process of claim 34 wherein the hydrocarbon feedstock comprises petroleum hydrocarbon residua.

43. The process of claim 34 wherein the hydrocarbon feedstock comprises oils or residua obtained from tar sands.

44. The process of claim 34 wherein the hydrocarbon feedstock contains metals in an amount of at least about 150 parts per million.

45. The process of claim 44 wherein said hydrocarbon feedstock comprises petroleum hydrocarbon residua.

46. The process of claim 44 wherein said hydrocarbon feedstock comrpises oils or residua obtained from tar sands.

* * * * *

UNITED STATES PATENT OFFICE
CERTIFICATE OF CORRECTION

Patent No. 4,225,421        Dated September 30, 1980

Inventor(s) Albert L. Hensley, Jr. et al

It is certified that error appears in the above-identified patent and that said Letters Patent are hereby corrected as shown below:

| Patent Column | Line | |
|---|---|---|
| 3 | 57 | "/3%" should be --3%-- |
| 6 | 39 | "is such" should be --is used-- |
| 12 | 33 | "$A_{2_4}$ +  should be --$A_2$ + 4-- |

Signed and Sealed this

Thirty-first Day of March 1981

[SEAL]

Attest:

RENE D. TEGTMEYER

Attesting Officer        Acting Commissioner of Patents and Trademarks